Nov. 3, 1942.                C. F. BALDWIN                2,301,007
                      CONSTANT TEMPERATURE APPARATUS
                           Filed June 22, 1940
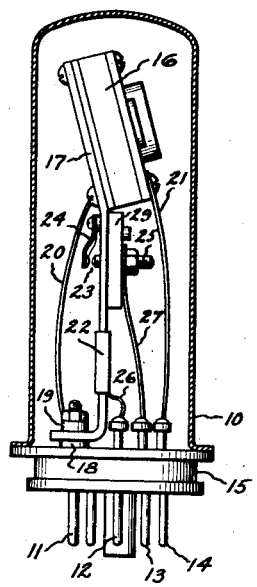
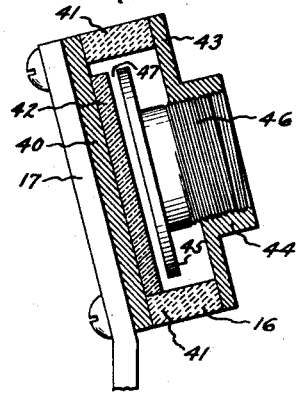
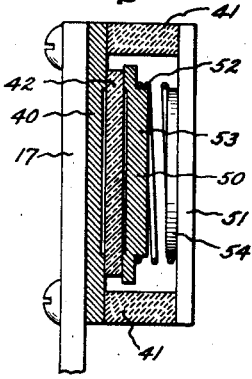
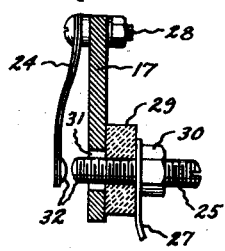
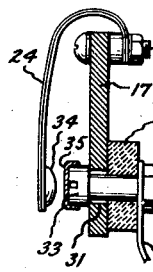
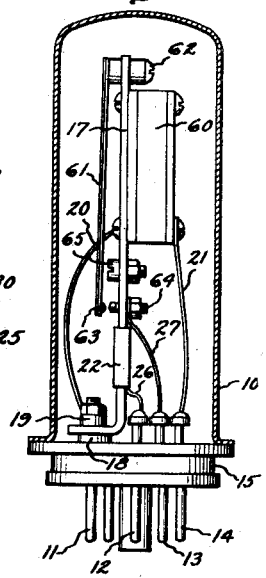
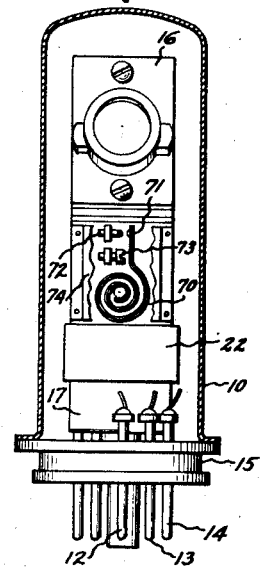
Inventor:
Charles F. Baldwin,
by Harry E. Dunham
His Attorney.

Patented Nov. 3, 1942

2,301,007

UNITED STATES PATENT OFFICE 2,301,007

CONSTANT TEMPERATURE APPARATUS

Charles F. Baldwin, Schenectady, N. Y., assignor to General Electric Company, a corporation of New York Application June 22, 1940, Serial No. 341,976

10 Claims. (Cl. 171—327)

This invention relates to heating means and more particularly to apparatus for maintaining a device at a constant temperature.

Certain devices, whose operating characteristics change upon change in temperature, are desirably maintained at a constant temperature for better operation. It is an object of my invention to provide means to maintain the temperature of a device within very narrow limits even when ambient temperatures change over wide limits.

It is a more particular object of my invention to provide apparatus to maintain the temperature of a device within one unit of temperature change when the ambient temperature varies as much as 90 or even 100, or more, units of temperature. My present invention is especially suited to maintain electric circuit elements, such as piezo electric vibrators, at highly constant temperatures under adverse conditions and over long periods of time. The features of my invention which I believe to be novel are set forth with particularity in the appended claims. My invention itself, however, both as to its organization and method of operation, together with further objects and advantages thereof may best be understood by reference to the following description taken in connection with the accompanying drawing in which Fig. 1 is a view, partly in section, of apparatus embodying my invention; Fig. 2 is a detailed sectional view of a portion of Fig. 1; Fig. 3 is a detailed sectional view of a modified form of a portion of Fig. 1; Fig. 4 is a sectional view of a device especially adapted for use in my invention; Fig. 5 is a modification of the device illustrated in Fig. 4; Fig. 6 is a modified form of the apparatus of Fig. 1; and Fig. 7 illustrates an additional modification of apparatus embodying my invention.

Referring to Fig. 1 of the drawing, I have shown therein a hermetically sealed vessel 10, having electric terminals 11, 12, 13 and 14 extending through one wall 15 thereof, housing a unit 16 comprising a piezo electric vibrator and a pair of electrodes, to be described later. The unit 16 is attached in good thermal contact to a supporting member or post 17, which is formed of copper and is supported from the end wall 15 of the vessel 10 by a pair of electric insulators 18 and 19, mounted on the end wall 15.

Electric circuit connections to the piezo electric unit 16 are made through contact prong 11, a conductor 20, the unit 16, a conductor 21, and contact prong 14. The conductors 20 and 21 are connected respectively to opposite electrodes of the unit 16. These conductors should be arranged to allow little heat to flow to and from the unit 16 therethrough. In certain situations, for example, it may be found desirable to make them of a size and of material having high resistance to heat flow. Nickel wires whose diameter is five thousandths of an inch have been used.

Heating means comprising a resistance heater unit 22 is formed around the supporting member 17 in the path of heat flow therethrough between the unit 16 and the wall 15 of the vessel 10. A thermostat 23, having a movable bi-metallic strip 24 and an adjustable stationary contact 25, is attached to the supporting member 17 at a point between the heater 22 and the unit 16. A source of voltage, not shown, is connected between the terminals 12 and 13 to form a circuit through that source, terminal 12, a conductor 26, the heater 22, the copper supporting member 17, the movable bimetallic strip 24, the adjustable contact 25, a conductor 27, and the terminal 13. This circuit may of course be arranged so as not to include post 17 whereby the heater circuit and circuit for unit 16 may be isolated.

In the structure so far described, heat flows from heater 22 to unit 16 primarily through the copper supporting post 17, and heat flows from the unit 16 to surrounding regions of lower temperature primarily by convection and radiation.

The thermostat 23 is responsive to some thermal condition, such as the temperature, of the supporting member or post 17 between the heater 22 and the unit 16. When the temperature of the post at that point is below a predetermined value, the circuit through the heater 22 is completed and heat is applied thereby to the member 17. Due to the fact that heat flows to the unit 16 principally through the supporting member 17, the described arrangement of the unit 16, the thermostat 23, and the heating means 22 with relation to the supporting member 17, is especially effective to maintain the unit 16 at constant temperature.

The arrangement is particularly well adapted to keep the unit 16 at a constant temperature, as may be seen by the following explanation.

Upon energization of the heater 22 heat flows through the supporting member 17 to the unit 16. There remains then only one path through which heat can leave the unit 16, that is, by radiation or convection, by which the amount of heat leaving unit 16 is minimized. There is thus a minimum difference in temperature between unit 16 and thermostat 24. Since thermostat 24 is characteristically at a constant temperature and unit 16 differs therefrom in minimum amount, the temperature of unit 16 is substantially constant.

A further advantageous effect arises from the arrangement of parts described in that the change in average temperature of the unit 16 is very small upon large changes in ambient temperature. The ratio of change of ambient temperature to change in average temperature of the unit 16 is sometimes designated "control ratio." It has been found that with apparatus constructed as described, control ratios have been obtained as large as 75 or 100 or even higher. It is thought that the reason for this effect is that the principal path of heat flow to the unit is from the source of heat past the thermostat which maintains the unit 16 at constant temperature.

In Fig. 2, which illustrates the structure of the thermostat 23, one end of the bimetallic element 24 is attached by means of a bolt 28 to the supporting post 17. An insulating block 29 is fastened to the post 17 and the adjustable contact 25, which is screw-threaded therein, is fastened in place by a lock nut 30. The contact 25 extends through a hole 31 in the post 17, so that it is insulated therefrom. Contacts 32 are provided at the places on the bimetallic element 24 and the contact 25 through which a conductive connection is made.

It has been found that air is a very satisfactory filler for the vessel 10 as it neither causes excessive heat loss from the unit 16 by convection, nor causes destructive arcing at the contacts 32, which are preferably made of a platinum-iridium alloy. It is, however, entirely within the scope of the invention to fill the vessel 10 with gases other than air, or to evacuate it.

The above described thermostat 23 is quite satisfactory in locations where the apparatus embodying my invention is not subject to sudden shocks. However, in certain locations, such as in airplanes and the like, it is desirable to assure more stable operation of the thermostat by providing snap action therefor. Also in case the heater is energized with continuous current, snap action may be desirable. Fig. 3 illustrates a thermostat designed to this end. The bimetallic element 24 is made longer and is bent around to the opposite face of the post 17, where it is fastened by the bolt 28. This extra length of the member 24 gives it greater flexibility. On the end of the adjustable contact 25 there is fixed a permanent magnet 33. If the bimetallic member 24 is not made of ferro-magnetic material, an armature may be provided thereon. For example, a contact tip 34 on the bimetallic member 24 may cover a ferro-magnetic armature to be attracted by the permanent magnet 33. The magnet 33 is likewise covered by a contact tip 35, which cooperates with the contact tip 34. The magnet 33 and its armature cooperate in a well known way, so that, as the member 24 approaches the magnet 33, they suddenly snap together. Conversely, as the bimetallic member 24 is stressed more and more highly to move away from the magnet 33, a point is reached at which the bimetallic member 24 suddenly snaps away from the permanent magnet 33.

Fig. 4 illustrates a cross sectional view of the unit 16. A supporting electrode 40, which is attached in good heat transfer relation to the supporting member 17, cooperates with a body 41 of ceramic material to support a quartz crystal piezo electric vibrator 42 closely adjacent to the electrode 40. The electrode 40 is preferably formed of stainless steel, which is carefully ground flat so as to lie in good thermal conducting relation with the vibrator 42. A cap 43 is attached to the ceramic body 41 opposite the electrode 40, and has in its center a screw threaded collar 44. A second electrode 45, having a screw threaded projection 46 which cooperates with the collar 44, is adjacent to the vibrator 42 on the opposite side from the electrode 40. The screw adjustment for the electrode 45 allows an air gap 47 between the vibrator 42 and the electrode 45 to be adjusted. Adjustment of the air gap 47 in a well known way changes the operating frequency of the vibrator 42.

The upper portion of the supporting member or post 17 is bent at an angle of about 15 degrees from the vertical, so that the vibrator 42 rests in good thermal relation with the electrode 40, to allow its temperature to be accurately controlled. This also assures a fixed position for the vibrator 42. The entire weight of the vibrator 42 is not supported upon its active face against electrode 40, and the vibrator 42 is therefore more effective in its operation. It is important in all forms of my invention that the vibrator 42 be maintained in good heat conducting relation with the supporting post 17, which should form the principal path for heat flow therefor.

In Fig. 5 an alternative form of piezo electric vibrator holder is illustrated. The vibrator 42 is pressed between an electrode 50 and the electrode 40. A cap 51 is attached to the seramic body 41 opposite to the electrode 40. A spring 52 between the electrode 50 and the cap 51 maintains a proper amount of pressure between the electrodes. Shoulders 53 and 54, respectively on the electrode 50 and the cap 51, maintain the spring 52 in pressing relation therebetween. In this alternative form of vibrator holder it is to be noted that the vibrator 42 is again maintained in intimate thermal relation with the electrode 40 and with the supporting member 17 even though the electrode faces are reversed. In this case the supporting member 17 is not bent to any particular angle, since the spring 52 serves to maintain good thermal contact between the vibrator 42, the electrode 40 and the supporting post 17.

In Fig. 6 a crystal unit 60 of the type illustrated by Fig. 5 is shown in apparatus embodying a slightly different form of my invention. In this modification many elements are similar to those illustrated in Fig. 1 and are given like reference characters. A somewhat different form of thermostat is utilized in this modification in order to provide greater stability in temperature control, when the apparatus is subject to shock. A bimetallic member 61 is fastened at one end to the upper end of the supporting post 17 by a screw 62. The free end of the member 61 has a contact tip 63, which cooperates with an adjustable contact 64. The adjustable contact 64 is supported in the supporting member 17 and is insulated therefrom. A circuit extends from the heater 22 through the supporting member 17, through the screw 62, the bimetallic member 61, the contact tip 63, the adjustable contact 64, the conductor 27, the terminal 13, through a source of potential, not shown, through the terminal 12, and through the conductor 26 back to the heater 22.

This construction of the bimetallic member 61, lying parallel to the supporting member 17, allows the bimetallic member to be of greater length, whereby it is more flexible. A permanent magnet 65 is fastened to the supporting member 17 in cooperating relation with the bimetallic member 61 to provide snap action therefor, as explained above. The flexibility of the member 61 allows a more positive snap action. The bimetallic member 61 is made to lie very close to the supporting member 17, so that it is closely responsive to the temperature thereof. The bimetallic member 61 is responsive, not only to the temperature of the supporting member 17 between the heater 22 and the device 60, but is also responsive in a certain degree to the temperature of the supporting member 17 adjacent the piezo electric device 60. While superior results have been obtained with the structure illustrated by Fig. 1, which is preferred, it appears that very good results are obtainable with a structure such as illustrated in Fig. 6.

In Fig. 7 there is illustrated an alternative structure in which a long flexible bimetallic member is provided, which is responsive only to the temperature of the supporting member 17 between the heating means 22 and the piezo electric device 16. In this figure many of the elements are similar to those illustrated in the structure of Fig. 1 and are given like reference characters. A spirally arranged bimetallic member 70 is supported at its central end on the supporting member 17. A contact 71 on the outer end of the bimetallic member 70 cooperates with a fixed adjustable contact 72 mounted on the supporting member 17. A permanent magnet 73, mounted on the supporting member 17, is arranged to cooperate with the outer end of the bimetallic member 70 to provide snap action. The circuit connections between the heater 22 and the bimetallic member 70 are similar to those described in connection with Figs. 1 and 6.

In order to assure that the bimetallic member 70 responds very closely to the temperature of the supporting member 17 between the heater 22 and the piezo electric device 16, an insulating hood 74, which is illustrated as partly broken away, may be arranged over the member 70.

While my invention is especially adapted to maintain constant temperature for a piezo electric vibrator, its scope is not limited to such use, since it is also capable of maintaining other devices at a constant temperature, such for example, as any instrument or device whose characteristics change undesirably with changes in temperature.

While I have shown a particular embodiment of my invention, it will, of course, be understood that I do not wish to be limited thereto, since different modifications may be made both in the circuit arrangements and instrumentalities employed, and I intend by the appended claims to cover any such modifications as fall within the true spirit and scope of my invention.

What I claim as new and desire to secure by Letters Patent of the United States is:

1. In combination, a piezo electric device to be maintained at a constant temperature, a heat conductive supporting post for said device having a supported end and a free end, means to support said device on said free end and to maintain heat flow to and from said device principally through said supporting post, a resistance heater attached to said supporting post between the supported end thereof and said device, and a thermostat attached to said post between said heater and said device responsive to the temperature of said supporting post to connect a source of potential to said heater below a predetermined temperature of said post.

2. In combination, a piezo electric vibrator to be maintained at a constant temperature, an electrode for said vibrator, means to maintain said vibrator and said electrode in intimate thermal relation, a heat conductive supporting post for said vibrator having a supported end and a free end, means to attach said electrode to said free end and to maintain heat flow to and from said vibrator principally through said supporting post, means to heat said supporting post between said supported end and said vibrator, and means to control the amount of heat applied by said heating means to said post in response to a thermal condition of said supporting post between said heating means and said vibrator, said post being of small cross section and having small mass whereby said vibrator quickly attains a constant temperature.

3. In combination, a hermetically sealed vessel, a piezo electric device within said vessel, an alternating current circuit including said device and connections therefor extending through the walls of said vessel, a heat conductive supporting post for said device supported within said vessel, means to support said device on said post and to maintain heat flow to and from said device principally through said post, a resistance heater attached to said post in the path of said principal heat flow, and a thermostat attached to said post between said heater and said device responsive to the temperature of said post to connect a source of potential to said heater below a predetermined temperature of said post.

4. In combination, a hermetically sealed vessel, a piezo electric vibrator within said vessel, an alternating current circuit including said vibrator and connections therefor extending through the walls of said vessel, an electrode for said vibrator, means to maintain said vibrator and said electrode in intimate thermal relation, a heat conductive supporting post within said vessel having a supported end and a free end, means to attach said electrode to said free end and to maintain heat flow to and from said vibrator principally through said post, means to heat said supporting post between said supported end and said vibrator, and means to control the amount of heat applied by said heating means to said post in response to a thermal condition of said supporting post between said heating means and said vibrator.

5. In combination, a hermetically sealed vessel, a piezo electric device within said vessel, an alternating current circuit including said device and connections therefor extending through the walls of said vessel, a supporting electrode for said device, a supporting member within said vessel having a portion fixed thereto, means to attach said electrode thereto at a substantial angle from vertical to maintain said device in intimate thermal relation with said electrode, means to maintain heat flow to and from said device principally through said electrode and said supporting member, means to heat said supporting member between said fixed portion and said electrode, and means to control the amount of heat supplied by said heating means in response to a thermal condition of said supporting member between said heating means and said device.

6. In combination, a hermetically sealed vessel, a piezo electric vibrator within said vessel, an alternating current circuit including said vibrator and connections therefor extending through the walls of said vessel, a pair of electrodes for said vibrator, means to press said electrodes against opposite faces of said vibrator, a heat conductive supporting post within said vessel having a supported end and a free end, means to support said vibrator on said free end and to maintain heat flow to and from said vibrator principally through said supporting post, means to heat said supporting post between said supported end and said vibrator, and means to control the amount of heat supplied by said heating means in response to a thermal condition of said supporting post between said heating means and said vibrator.

7. In combination, a body whose characteristics change undesirably with changes in temperature, a supporting heat conducting post having a free end on which said body is supported in good heat conducting relation and having a supported end spaced from said body and said free end and in heat transferring relation with the surrounding regions of variable temperatures, said body being substantially insulated from said surrounding regions except through said post so that heat transfer between said body and such regions takes place principally through said supporting post, means in heat transferring relation with said supporting post for maintaining a part of said post between said supported end and said body at a temperature different from the variable temperatures of said surrounding regions, and means responsive to a thermal condition of said supporting post between said body and said last means for controlling the operation of said last means.

8. In combination, a hermetically sealed vessel having a wall portion affected by ambient temperature changes, a heat conductive supporting post within said vessel having one end supported from said wall portion and a free end spaced therefrom, a piezoelectric device within said vessel supported on said free end in good heat conducing relation therewith, said device having an operating frequency subject to undesirable variation with changes in temperature, an alternating current circuit including said device and connections therefor extending through the walls of said vessel, said device being substantially insulated from the walls of said vessel except through said post whereby the heat transfer between said device and said post maintains said device and said post at substantially the same temperature, a resistance heater attached to said post between said device and said supported end, and a thermostat attached to said post between said heater and said device responsive to the temperature of said post to connect a source of potential to said heater below a predetermined temperature of said post, said thermostat being adjusted to maintain said post, and consequently said device, at a temperature constantly higher than the varying temperatures of said vessel and substantially constant.

9. In combination, a body whose characteristics change undesirably with changes in temperature, the region surrounding said body being subject to temperatures variable over a range, an elongated heat conductive supporting post having a free end and a supported end spaced from said free end and affected by the varying temperatures of said surrounding region, means for supporting said body on said free end in good heat conducting relation therewith, said body being substantially insulated from said surrounding region except through said post so that the principal path of heat flow between said body and said surrounding region is through said supporting post, whereby said body and said free end of said post remain at substantially the same temperature, means for maintaining the temperature of said supporting post between said supported end and said body at a value different from temperatures within said range, and means responsive to the temperature of said supporting post between said last means and said body for controlling said last means to maintain the temperature of said post between said last means and said body, and consequently the temperature of said body, substantially constant.

10. In combination, a body whose characteristics change undesirably with changes in temperature, a chamber having walls surrounding said body, the region surrounding said chamber and the walls of said chamber being subject to temperatures variable over a range of temperatures, an elongated heat conductive supporting post having a free end and a supported end fixed to a wall of said chamber, means for supporting said body on said free end of said supporting post in good heat conducting relation therewith, said body being substantially insulated from the walls of said chamber except through said post whereby said body and said post remain at substantially the same temperature, means for maintaining the temperature of said post between said supported end and said body at a value different from temperatures in said range, and means responsive to the temperature of said supporting post between said last means and said body for controlling said last means to maintain the temperature of said post between said last means and said body, and consequently the temperature of said body, substantially constant.

CHARLES F. BALDWIN.

CERTIFICATE OF CORRECTION.

Patent No. 2,301,007.

November 3, 1942.

CHARLES F. BALDWIN.

It is hereby certified that error appears in the printed specification of the above numbered patent requiring correction as follows: Page 2, second column, line 32, for "seramic" read --ceramic--; page 4, first column, line 40-41, claim 8, for "conducing" read --conducting--; page 3, second column, line 19, beginning with "3. In combination" strike out all to and including the word and period "post." in line 33, comprising claim 3; and for the claims now numbered "4", "5", "6", "7", "8", "9", and "10", read --3--, --4--, --5--, --6--, --7--, --8--, and --9-- respectively; and in the heading to the printed specification, line 7, for "10 Claims" read --9 Claims--; and that the said Letters Patent should be read with this correction therein that the same may conform to the record of the case in the Patent Office.

Signed and sealed this 12th day of January, A. D. 1943.

(Seal)

Henry Van Arsdale,
Acting Commissioner of Patents.